(12) United States Patent
Kataoka et al.

(10) Patent No.: US 7,540,351 B2
(45) Date of Patent: Jun. 2, 2009

(54) STEERING CONTROL SYSTEM (75) Inventors: Motoaki Kataoka, Kariya (JP); Nobuya Miwa, Toyohashi (JP)

(73) Assignee: Denso Corporation, Kariya (JP)

( * ) Notice: Subject to any disclaimer, the term of this patent is extended or adjusted under 35 U.S.C. 154(b) by 358 days.

(21) Appl. No.: 11/484,568

(22) Filed: Jul. 12, 2006

(65) Prior Publication Data

US 2007/0017735 A1    Jan. 25, 2007

(30) Foreign Application Priority Data

Jul. 19, 2005  (JP)  ............................. 2005-208453

(51) Int. Cl.
*B62D 5/04* (2006.01)
*B62D 6/00* (2006.01)

(52) U.S. Cl. ....................... 180/446; 180/443; 180/444; 701/41; 701/42; 701/43

(58) Field of Classification Search ................ 180/446, 180/443, 444; 701/41, 42, 43
See application file for complete search history.

(56) References Cited

U.S. PATENT DOCUMENTS

| | | | | |
|---|---|---|---|---|
| 5,053,966 A | * | 10/1991 | Takahashi et al. | 701/41 |
| 5,194,794 A | * | 3/1993 | Shamoto | 318/603 |
| 5,743,351 A | * | 4/1998 | McLaughlin | 180/446 |
| 5,969,969 A | * | 10/1999 | Ejiri et al. | 701/41 |
| 6,131,693 A | * | 10/2000 | Mukai et al. | 180/446 |
| 6,184,637 B1 | * | 2/2001 | Yamawaki et al. | 318/432 |
| 6,459,972 B2 | * | 10/2002 | Kodaka et al. | 701/43 |
| 6,816,765 B2 | * | 11/2004 | Yamamoto et al. | 701/41 |
| 2005/0267648 A1 | | 12/2005 | Mabuchi et al. | |
| 2007/0253597 A1 | * | 11/2007 | Utida et al. | 382/104 |

FOREIGN PATENT DOCUMENTS

JP    A-06-298112    10/1994

* cited by examiner

*Primary Examiner*—Paul N Dickson
*Assistant Examiner*—Marlon A Arce
(74) *Attorney, Agent, or Firm*—Posz Law Group, PLC

(57) ABSTRACT

A steering control system includes a steering wheel and a steering shaft with upper and lower shaft portions. Steering shaft torque of the lower shaft portion corresponds to torque transmitted to the upper shaft portion, and steering shaft torque steers vehicle wheels. A steering torque detector is included for detecting steering torque. An assist force generating device generates assist forces according to a control signal to thereby generate torque in the lower shaft portion. A controller is included for outputting the control signal based upon the steering torque. A vehicle speed detector detects speed of the vehicle, and an environment information detector detects environment information. A basic assist amount is set according to the vehicle speed and the steering torque, and a torque correction amount is determined based upon the environment information. Additionally, the assist force is determined based upon the basic assist amount and the torque correction amount.

16 Claims, 7 Drawing Sheets

STEERING CONTROL SYSTEM

CROSS-REFERENCE TO RELATED APPLICATION

This application is based on and claims the benefit of priority of Japanese Patent Application No. 2005-208453, filed on Jul. 19, 2005, the disclosure of which is incorporated herein by reference.

TECHNICAL FIELD

The present invention relates to a steering control system for determining a steering shaft torque of a steering shaft.

BACKGROUND INFORMATION

Movement characteristics of a vehicle depend on the operation of vehicle systems (e.g., the engine system, the steering system, the suspension system, the braking system, etc.) and also on external influences (e.g., the road gradient, etc.). The driver typically drives the vehicle in a predictable manner based on the recognition or anticipation of these movement characteristics. The driver typically adapts to characteristic changes of the vehicle. Detailed examples are listed as follows:

1) Characteristic Changes Related to Vehicle Systems:

In general, vehicle understeer can affect a vehicle as a turning curvature increases (i.e., where lateral acceleration increases). The understeer behavior depends upon vehicle weight distribution, suspension geometry (i.e., suspension geometrical structure), suspension kinematics (i.e., characteristic change when receiving forces), and tire characteristics, for example. Additional steering is more likely to be insufficient as the vehicle turns through a deeper curve, thereby creating an understeer characteristic.

2) Characteristic Change Caused by Travel Conditions:

Steering behavior changes as the vehicle speed changes. For instance, FIG. 7 includes a plurality of graphs showing a change of steering in accordance with vehicle speed where the vehicle travels on the same curved path at different speeds. Specifically, FIG. 7 shows changes in steering wheel angle, yaw rate, and lateral acceleration as changes of steering in accordance with vehicle speeds.

Figure 7:
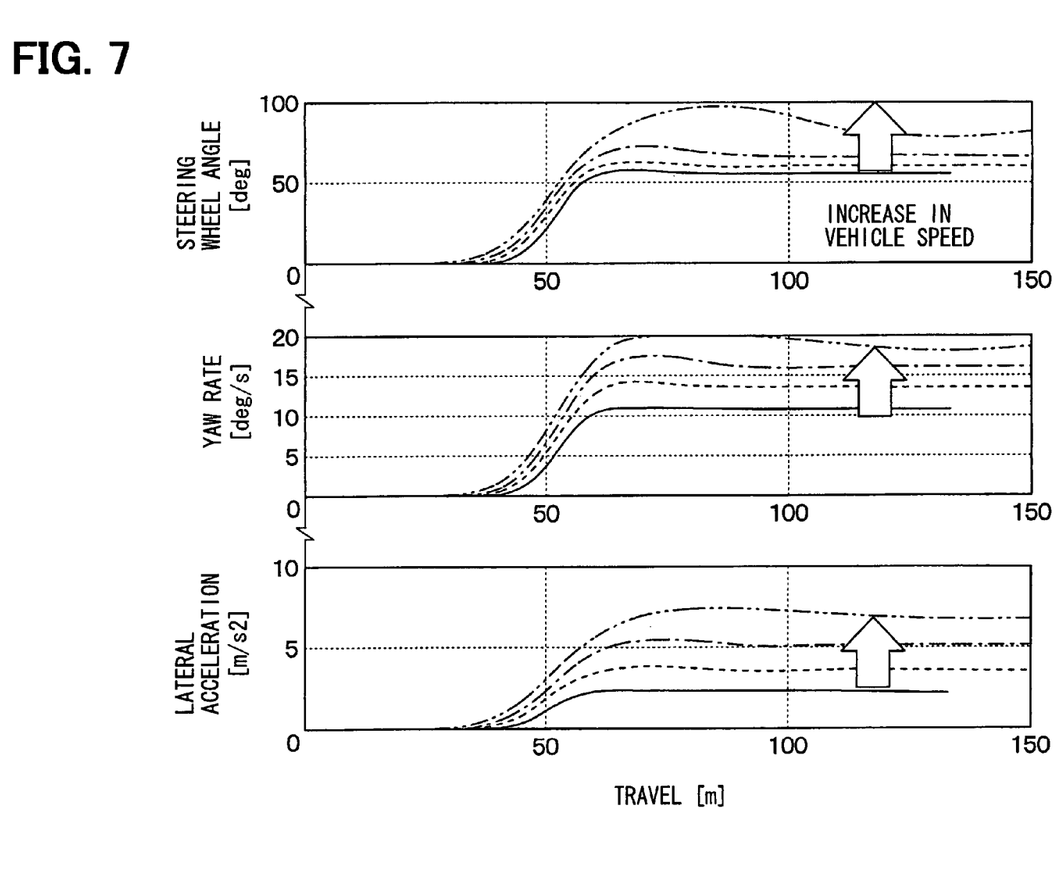
FIG. 7 is a collection of graphs showing steering changes in accordance with vehicle speeds when a vehicle travels on the same turning radius at different speeds.

As seen in FIG. 7, the steering wheel angle, yaw rate, and lateral acceleration change with vehicle speed and are more vibratory at approximately a sprung natural frequency as the vehicle speed increases. Therefore, the driver operates the steering wheel and adapts to these changes.

Further, load balance between the front and rear wheels changes as the road gradient changes. As a result, steering characteristics change. For example, when the vehicle travels uphill, loads in the front wheels reduce, and understeering characteristics are more likely. On the other hand, when the vehicle travels downhill, loads in the front wheels increase, and oversteering characteristics are more likely.

In addition, the driver steers the vehicle based upon surrounding states of the vehicle. The driver selects a steering direction, and the driver typically reacts to surrounding states of the vehicle, correcting the steering direction according to vehicle movement feedback, states of the road surface, and the like.

Japanese Patent Abstract Publication No. 06-298112 relates to a four-wheel-steering system (Four-WS system). Responsiveness of the vehicle behavior (e.g., yaw rate) increases based upon steering wheel angle or steering angle of a tire calculated from the steering wheel angle. Accordingly, a steering angle of the front or rear tire is corrected for improving vehicle stability, or a detected yaw rate is incorporated into steering control methods.

Other conventional systems are designed such that when a driver performs a steering operation, a steering motor is operated to add an assist force to the force provided by the driver. Thus, the driver input force and the assist force creates torque in the steering shaft is supplied by the driver input and the assist force. Steering control systems have been designed to adjust the assist force when a vehicle spin or a vehicle drift is detected for improved stability.

As described above, a Four-WS system can improve vehicle stability. However, these systems can be prohibitively expensive. Furthermore, these systems can undesirably increase the weight of the vehicle.

In addition, steering control systems with steering motors can provide added stability by adjusting the assist forces. However, the assist forces are typically adjusted during vehicle spin or vehicle drift situations. These systems typically do not affect normal driving situations, and thus are of little use for affecting response to steering reaction and vehicle behavior.

Further, drivers often operate the vehicle largely according to what the driver sees in the surrounding environment. (It is estimated that 80% of information used for driving the vehicle is optical information.) As a result, driving characteristics can largely depend on how the environment changes visually. Also, when the road ahead of the vehicle is a curve or a hill, when a vehicle is parked ahead, or where the road ahead of the vehicle narrows, accelerations perceived by the driver will vary depending on the situation. The weather and/or visibility can also affect the driver's steering behavior. In addition, the driver's steering behavior may vary depending on whether the driver's line of sight is generally near the vehicle or generally in the distance.

More specifically, a driver is more likely to sense acceleration, decelerations, and yaw as the posture of the vehicle changes. For example, during deceleration, the front of the vehicle may pitch forward making it more likely for the driver to sense the deceleration. During acceleration, the vehicle may pitch rearward making it more likely for the driver to sense the acceleration. Further, a vehicle may roll during a turn causing the driver to more likely sense the turn.

In addition, relations between actual vehicle behavior during acceleration, deceleration, or turning, vehicle posture, and operation of vehicle components by the driver change due to vehicle characteristics or road environments. Therefore, a driver is required to perform a correction operation corresponding to the changed relation at proper timing.

Furthermore, while changing lanes, a driver expects lateral movement behavior of a vehicle rather than a rotational movement. This is because the driver views things generally straight ahead of the vehicle. Thus, the expectation degree to the turning is small. The Four-WS system steers the rear wheels in the same phase direction as the front wheels at high speeds. However, the vehicle behavior is not optimized based upon recognition of the environment of the vehicle, especially ahead of the vehicle.

In view of the above, there exists a need for a steering control system that overcomes the above-mentioned problems in the conventional art. The present invention addresses this need in the conventional art as well as other needs, which will become apparent to those skilled in the art from this disclosure.

SUMMARY OF THE INVENTION

A steering control system for a vehicle is disclosed that includes a steering wheel and a steering shaft with an upper shaft portion and a lower shaft portion. Torque is transmitted to the upper shaft portion by a steering input to the steering wheel. Steering shaft torque of the lower shaft portion corresponds to the torque transmitted to the upper shaft portion, and the steering shaft torque steers the wheels of the vehicle. The steering control system also includes a steering torque detector, which detects a steering torque by generating an output signal corresponding to a torsion angle between the upper shaft portion and the lower shaft portion. Furthermore, the steering control system includes an assist force generating device which generates an assist force according to a control signal to thereby generate torque in the lower shaft portion. The steering control system also includes a controller for outputting the control signal to the assist force generating device based upon the steering torque. The steering control system additionally includes a vehicle speed detector which detects a speed of the vehicle and an environment information detector which detects environment information of the vehicle. The controller includes a basic assist amount setting device, which sets a basic assist amount according to the vehicle speed and the steering torque. The controller also includes a torque correction amount setting device, which determines a torque correction amount based upon the environment information. Additionally, the controller includes an assist correction device, which determines the assist force based upon the basic assist amount and the torque correction amount.

A steering control system for a vehicle is also disclosed, which includes a steering wheel and a steering shaft with an upper shaft portion and a lower shaft portion. Torque is transmitted to the upper shaft portion by a steering input to the steering wheel, steering shaft torque of the lower shaft portion corresponds to the torque transmitted to the upper shaft portion, and the steering shaft torque steers the wheels of the vehicle. The steering control system also includes a steering torque detector, which generates an output signal corresponding to a torsion angle between the upper shaft portion and the lower shaft portion to detect a steering torque. Furthermore, the steering control system includes a motor operated according to a control signal to generate an assist force, thereby generating torque in the lower shaft portion. The steering control system additionally includes a controller for outputting the control signal to the motor based upon the steering torque detected by the steering torque detector. The steering control system also includes a vehicle speed detector which detects a vehicle speed of the vehicle. Furthermore, the steering control system includes a vehicle state detector, which detects a vehicle state correlating to a behavior of the vehicle. The controller includes a basic assist amount setting device, which sets a basic assist amount in accordance with the vehicle speed and the steering torque. The controller also includes a torque correction amount setting device, which determines a torque correction amount based upon the vehicle state detected by the vehicle state detector. The controller further includes an assist correction device, which determines the assist force based upon the basic assist amount and the torque correction amount.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE PREFERRED EMBODIMENT(S)

First Embodiment

Figure 1:
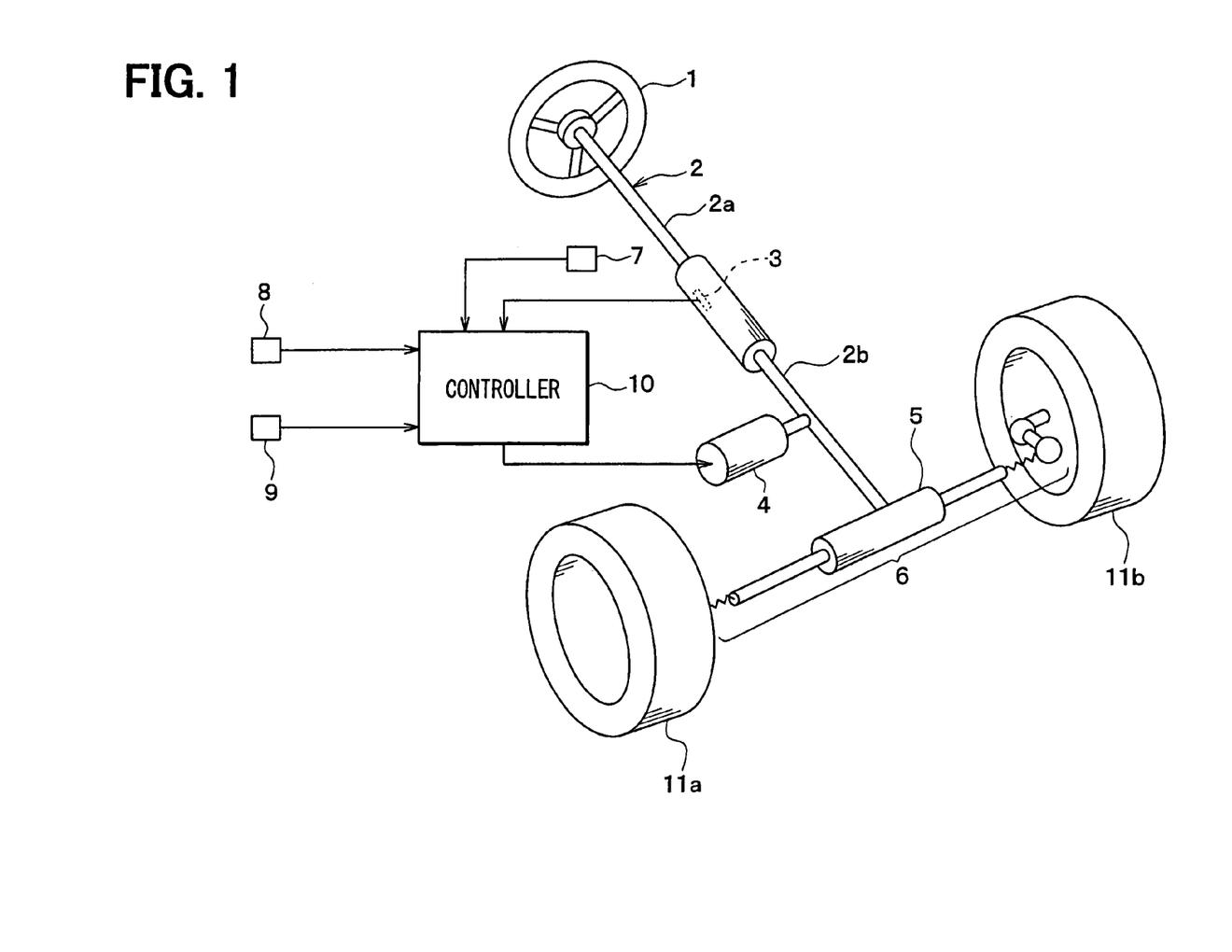
FIG. 1 is a schematic illustration of one embodiment of a steering control system.
Figure 2:
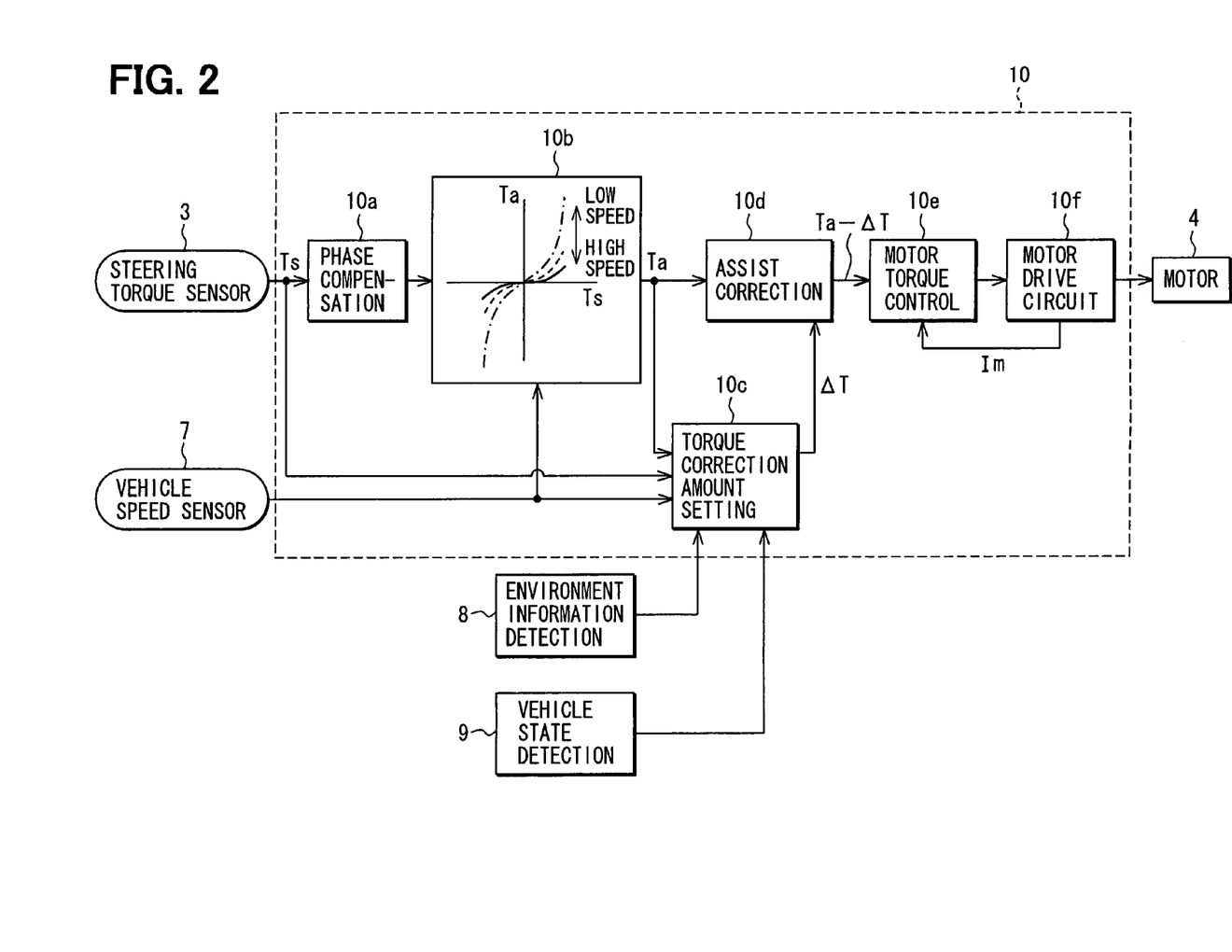
FIG. 2 is a schematic illustration of the steering control system of FIG. 1.

Referring initially to FIGS. 1 and 2, a steering control system of the present disclosure is illustrated. The steering control system shown in the first embodiment is called an electric power steering (EPS). The steering control system includes a steering wheel 1, a steering shaft 2, a steering torque sensor 3, a motor 4, a steering gear mechanism 5, a steering link mechanism 6, a vehicle speed sensor 7, an environment information detecting section 8, a vehicle state detecting section 9, a controller 10 and the like to perform adjustment of an angle to a central line of both front wheels 11a, 11b.

A driver operates the steering wheel 1 manually by turning the wheel 1. This causes the steering shaft 2 to rotate through a steering column (not shown).

The steering shaft 2 transmits the steering operation by the driver as a steering force. The steering shaft 2 is divided into a plurality of parts. In the embodiment shown, the steering shaft 2 includes an upper shaft portion 2a adjacent the steering wheel 1. The steering shaft 2 also includes a lower shaft portion 2b adjacent the steering gear mechanism 5. Torque generated by the driver is transmitted directly to the upper shaft portion 2a. Torque is also generated in the lower shaft portion 2b. The torque of the lower shaft portion 2b is referred to as "steering shaft torque." Torque in the upper shaft portion 2a may transfer to the lower shaft portion 2b, and in addition, the motor 4 may provide an assist force. In other words, the assist force from the motor 4 is transmitted to the lower shaft portion 2b in addition to the torque transmitted from the upper shaft portion 2a.

In one embodiment, the steering control system has a mode in which the steering shaft torque is the torque in the upper shaft portion 2a plus the assist force from the motor 4. The steering control system includes another mode in which the steering shaft torque is merely the assist force from the motor 4. The present invention applies to either mode.

The steering torque sensor 3 (i.e., the steering torque detector) generates an output signal in accordance with a torsion angle at a connection portion of the steering shaft 2 (i.e., between the upper shaft portion 2a and the lower shaft portion 2b) for detecting steering torque Ts.

The motor 4 (i.e., the assist force generating device) is driven according to a motor control signal from the controller 10 to thereby add an assist force to the lower shaft portion 2b. More specifically, the motor control signal correlates to a motor torque, and the motor 4 is driven to add an assist force corresponding to the motor torque to the lower shaft portion 2b. Accordingly, the motor 4 generates at least a portion of the steering shaft torque in the lower shaft portion 2b.

The steering gear mechanism 5 is formed of a combination of gears. In one embodiment, the steering gear mechanism 5 is a rack-and-pinion steering gear mechanism, which converts the steering shaft torque of the lower shaft portion 2b into a force directed perpendicular to the lower shaft portion 2b.

The steering link mechanism 6 transmits the force from the steering gear mechanism 5 through a pitman arm and a tie rod to a steering knuckle to turn the right and left wheels 11a and 11b.

The vehicle speed sensor 7 (i.e., a vehicle speed detector) outputs a detection signal in accordance with a speed of the vehicle. The detection signal of the vehicle speed sensor 7 is transmitted to the controller 10. In one embodiment, the vehicle speed sensor 7 is used for transmitting data corresponding to the vehicle speed to the controller 10. In another embodiment a vehicle wheel speed sensor (not shown) is used to detect vehicle speed. In still another embodiment, vehicle speeds are calculated based upon data obtained by the vehicle speed sensor 7 or the vehicle wheel speed sensor, and the calculation result itself is transmitted to the controller 10.

The environment information detecting section 8 (i.e., the environment information detector) detects the environment of the vehicle to which it is mounted (i.e., the "reference vehicle.") For instance, the environment information detecting section 8 can detect the road environment ahead of the reference vehicle. In one embodiment, the environment information detecting section 8 is able to detect a curve and/or an inclination (i.e., slope and/or cant) in the road ahead. Furthermore, in one embodiment, the environment information detecting section 8 is able to detect the state of nearby vehicles (e.g., the number of nearby vehicles, the distances to nearby vehicles, relative speeds, and/or relative position of nearby vehicles). In addition, in one embodiment, the environment information detecting section 8 is able to detect branching and/or merging in the road ahead. Also, in one embodiment, the environment information detecting section 8 can detect whether an intersection and/or a railroad crossing exists ahead of the reference vehicle. Still further, in one embodiment, the environment information detecting section 8 is able to detect a width of the road that the reference vehicle is driving upon and/or whether obstacles are present ahead of the reference vehicle. Additionally, in one embodiment, the environment information detecting section 8 can detect the weather that the reference vehicle is driving in. Also, in one embodiment, the environment information detecting section 8 is able to detect the visibility from the reference vehicle (i.e., the zone of distance surrounding the reference vehicle within which the driver can see). Moreover, in one embodiment, the environment information detecting section 8 can detect whether the reference vehicle is driving in a hazardous environment.

In one embodiment, the environment information detected by the environment information detecting section 8 indicates where the driver is more likely to look. In other words, the environment information indicates whether the driver is more likely to view surroundings near the vehicle (i.e., within a predetermined distance of the vehicle) or whether the driver is more likely to view objects that are positioned away from the vehicle (i.e., outside the predetermined distance of the vehicle). For instance, in one embodiment, the environment information indicates the driver is more likely to view surroundings near a vehicle (i.e., surroundings within a predetermined distance of the vehicle) when the vehicle speed is low, as the vehicle approaches a curve with a relatively small radius of curvature (i.e., the curve is large), when the vehicle is traveling uphill, when the vehicle is merging, when the road is relatively narrow, when another vehicle is approaching, when the reference vehicle is approaching an obstacle, when the weather conditions are bad, and/or when the visibility is relatively low.

The detection result of the environment information detecting section 8 is designed to be transmitted to the controller 10 to determine the amount of assist force to be generated by the motor 4. In other words, the assist forces are supplied in an amount corresponding to the particular environment detected by the environment information detecting section 8, for instance, when the environment information detecting section 8 determines that the driver is likely to view surroundings near the vehicle, or when the environment information detecting section 8 detects a hazardous environment.

In one embodiment, the environment information detecting section 8 includes an in-vehicle camera. Also, in one embodiment, the environment information detection section 8 includes an obstacle sensor, such as a laser sensor, to detect obstacle ahead of the vehicle. As such, the environment information detecting section 8 obtains image data surrounding (e.g., in front of) the vehicle. The environment information detecting section 8 analyzes the image data to obtain environment information adjacent the vehicle. Also, the environment information detecting section 8 analyzes the image data obtained by the in-vehicle camera to determine the environment surrounding the vehicle. For instance, the environment information detecting section 8 detects whether another vehicle is ahead of the reference vehicle. When another vehicle is ahead of the reference vehicle, the environment information detecting section 8 detects the distance to the other vehicle. In one embodiment, the environment information detecting section 8 detects the number of vehicle surrounding the reference vehicle, a relative speed of each surrounding vehicle, and/or the relative position of each surrounding vehicle.

In one embodiment, the environment information detecting section 8 also includes a navigation device for obtaining one or more electronic road maps. For instance, the navigation device includes road map data. As such, the environment information detecting section 8 transmits the road map data itself to the controller 10 as the environment information. Also, in one embodiment, the environment information detecting section 8 processes the road map data to obtain the environment information, which is then transmitted to the controller 10.

In one embodiment, the navigation device includes nodes and segments corresponding to roads that are stored as the road map information. Also, road gradient and road canting information, which corresponds to the nodes and segments, is stored therein. Furthermore, information regarding road branching/merging, intersections, railroad crossings, road widths and the like is stored as the road map information in the navigation device. Based upon the road map data, the environment information detecting section 8 identifies the current position of the reference vehicle to detect the road on which the reference vehicle is traveling. More specifically, the environment information detecting section 8 uses a position detecting function generally provided in the navigation device to detect various aspects of the road, such as an approaching curve, road gradient, and/or cant of the road. Then, the environment information detecting section 8 transmits the information about the road to the controller 10. Also, in one embodiment, the environment information detecting section 8 provides information regarding ease of turning of the reference vehicle relative to the aspects (i.e., curvature, cant, etc.) of the approaching road.

Further, in one embodiment, the environment information detecting section 8 includes an acceleration sensor. As such, the environment information detecting section 8 determines a gradient of the road on which the reference vehicle is traveling (i.e., the road gradient) with a known method based upon the current acceleration and the prior acceleration detected by the acceleration sensor or the like.

It should be noted that this information can be obtained by various sensors of any suitable type. Also, in one embodiment, the information can be obtained by communicating with a source outside the reference vehicle. For instance, the information can be obtained by communication between a road and the reference vehicle, communication between the reference vehicle and another vehicle, and the like.

In addition, the vehicle state detecting section 9 (i.e., the vehicle information detector) detects a vehicle behavior (e.g., a turning state of the reference vehicle). For example, the vehicle state detecting section 9 includes a steering wheel angle sensor, a yaw rate sensor, a lateral acceleration sensor and the like. The vehicle state detecting section 9 is adapted to detect a turning state of a vehicle by estimating a turning degree based upon these detection signals. In another embodiment, the vehicle state detecting section 9 detects a turning state of a vehicle based upon a difference in speed between right and left wheels 11a, 11b. The difference in speed between the right and left wheels can be determined based upon a differential component between each vehicle wheel 11a, 11b determined based upon a detection signal of the wheel speed sensor. In still another embodiment, the vehicle state detecting section 9 detects the turning state of the vehicle based upon the steering force. The steering force may be determined by a sensor that detects reaction to a steering wheel operation, by monitoring rotational angles of the steering wheel shaft and a pinion shaft to detect a difference therebetween, or by monitoring hydraulic pressure in a hydraulic power steering unit.

The controller 10 generates a motor control signal for driving the motor 4 based upon detection signals from the steering torque sensor 3, the vehicle speed sensor 7, the environment information detecting section 8, and the vehicle state detecting sensor 9. As shown in FIG. 2, the controller 10 is structured to be provided with a phase compensation section 10a, a basic assist amount setting section 10b, a torque correction amount setting section 10c using a vehicle model, an assist correction section 10d, a motor torque control section 10e, and a motor drive circuit 10f.

The phase compensation section 10a is adapted to advance a phase of a steering torque Ts shown by a detection signal of the steering torque sensor 3 to perform phase compensation to thereby improve stability of the steering system.

The basic assist amount setting section 10b sets a basic assist amount, Ta, based upon the steering torque, Ts, after the phase compensation is performed by the phase compensation section 10a and the vehicle speed. For example, since a plurality of characteristic curves (correlative relation between steering torque Ts and basic assist amount Ta) are set corresponding to vehicle speeds, a characteristic curve corresponding to a vehicle speed is selected based upon the current vehicle speed, and the basic assist amount is set based upon the selected characteristic curve. In one embodiment, the basic assist amount, Ta, increases at a relatively large rate (regardless of vehicle speed) until the steering torque, Ts, increases to some degree, and then the basic assist amount, Ta, does not increase further. Further, the basic assist amount Ta is set to reduce as vehicle speed increases, and the basic assist amount Ta is set to increase as vehicle speed decreases.

The torque correction amount setting section 10c uses a vehicle model and feedback to determine a torque correction amount $\Delta T$ in accordance with a vehicle state or a surrounding environment. That is, the correction amount is determined for reducing adjustment steering (i.e., an operation load with the torque correction) a driver performs in response to the vehicle state or the surrounding environment.

Figure 3:
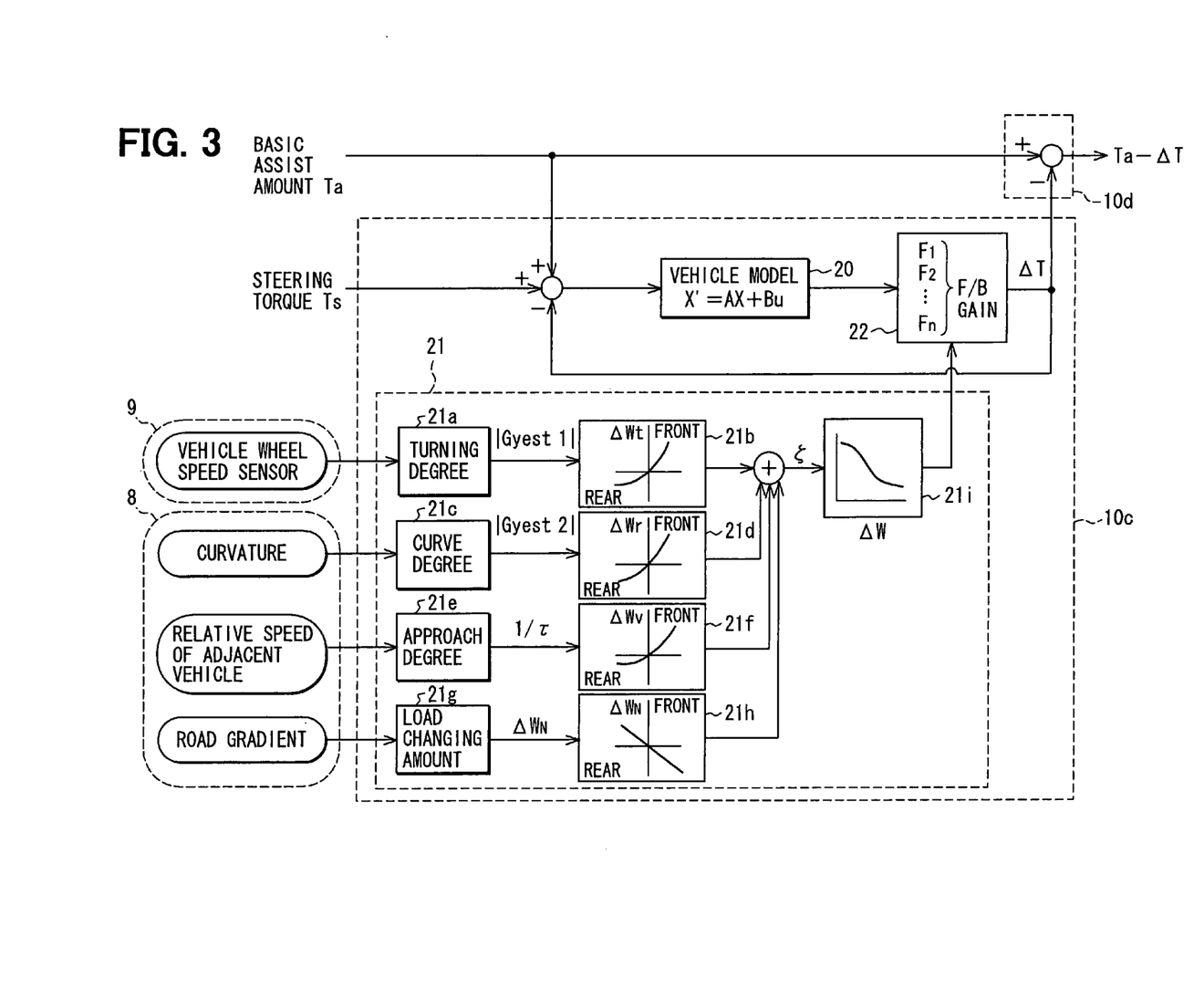
FIG. 3 is a schematic illustration of the steering control system of FIG. 1.

FIG. 3 is a block diagram showing a case where the torque correction amount setting section 10c is arranged as a system to perform the state feedback.

The torque correction amount setting section 10c determines a torque correction amount $\Delta T$ using a pole assignment known as one of state feedback controls, for example. For instance, in one embodiment, a pole of the vehicle model has the vibratory feature like vehicle body rolling. The pole contributing to such vibration is focused and a feedback gain for arranging the pole at a place where stable, required response is obtained is determined. As such, the torque correction amount setting section 10c determines the torque correction amount $\Delta T$ based upon the feedback gain.

For example, as shown in FIG. 3, the torque correction amount setting section 10c is arranged to include the vehicle model 20, a load calculating section 21, and a feedback gain setting section 22.

Figure 4A:
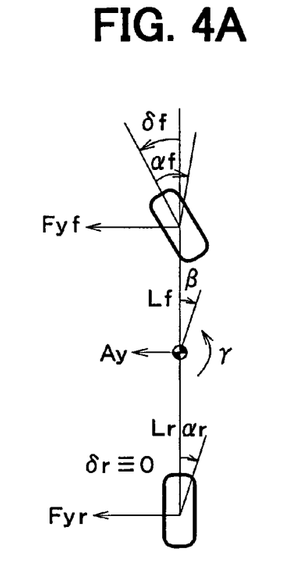
FIGS. 4A, 4B, and 4C are diagrams showing vehicle turning, vehicle rolling, and operation of the steering system, respectively.
Figure 4B:
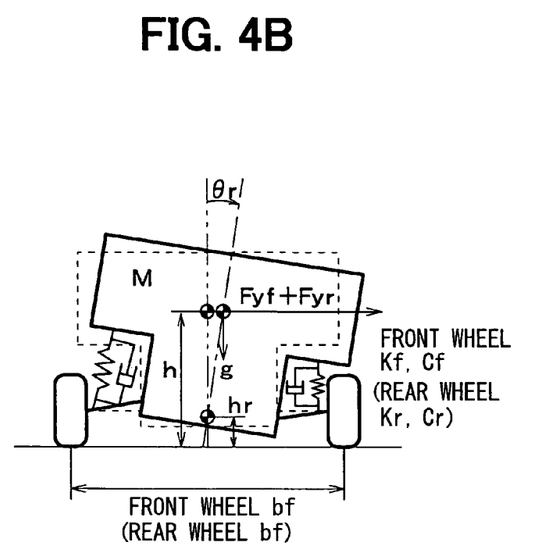
Figure 4C:
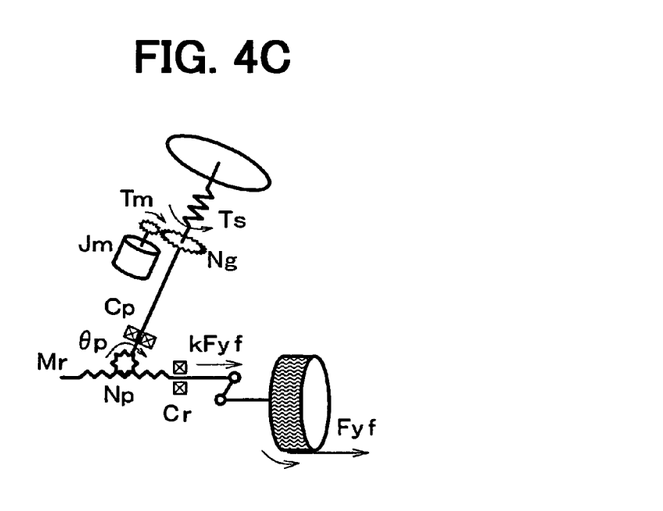

The vehicle model 20 references a vehicle state equation relating to vehicle turning movement, vehicle rolling movement, and steering system movement. FIGS. 4A, 4B, and 4C each show a state of each vehicle component during each movement, respectively. A vehicle state equation for each movement will be hereinafter explained.

[Vehicle Turning Movement]

As shown in FIG. 4A, yaw inertia moment is denoted by Iz, a distance from the center of gravity to the front wheels is denoted by Lf, and a distance from the center of gravity to the rear wheels is denoted by Lr. A lateral force of the front wheel is denoted by Fyf, and a lateral force of the rear wheel is denoted by Fyr. A yaw rate is denoted by $\gamma$, and motion around the vehicle body yaw axis is represented by the following equation.

$$Iz\gamma'=LfFyf-LrFyr \quad \text{(Equation 1)}$$

Furthermore, vehicle weight is denoted by M and a lateral acceleration is denoted by Ay. Thus, a motion equation for the vehicle body lateral direction is represented by the following equation.

$$MAy=Fyf+Fyr \quad \text{(Equation 2)}$$

In addition, a slip angle of the vehicle body is denoted by $\beta$, and a vehicle speed is denoted by V. Thus, a derivative of a slip angle of the vehicle body is represented by the following equation.

$$\beta'=Ay/V-\gamma \quad \text{(Equation 3)}$$

Further, the road surface friction coefficient is denoted by $\mu$ and cornering power of the front and rear wheels is denoted by Cpf and Cpr, respectively. Slip angles of the front and rear wheels are denoted by $\alpha f$ and $\alpha r$, respectively. Thus, lateral forces in the front and rear wheels are represented by the following equations, respectively.

$$Fyf \approx \mu Cpf \alpha f Fzf = Kf \alpha f \quad \text{(Equation 4)}$$

$$Fyr \approx \mu Cpr \alpha r Fzr = Kr \alpha r \quad \text{(Equation 5)}$$

Steering angles of the front and rear wheels are denoted by $\delta f$ and $\delta r$, respectively. Thus, slip angles, $\alpha f$ and $\alpha r$, of the front and rear wheels are respectively represented by the following equations.

$$\alpha r = \delta f - Lf \gamma / V - \beta \quad \text{(Equation 6)}$$

$$\alpha r = \delta r + Lr \gamma / V - \beta \quad \text{(Equation 7)}$$

It is noted that the above vehicle model is simplified. More specifically, the above model is a two-wheel model (i.e., the right and left wheels are united). Also, saturation characteristics of lateral forces in the front and rear wheels, a change in lateral force by load shift, fixation of road surface $\mu$, a movement change by forces after and before a tire, approximation of trigonometric function, and effects of the suspension system (e.g., compliance steer and the like) are ignored.

[Vehicle Rolling Movement]

Referring to FIG. 4B, the following equation is established based upon a rolling inertia moment, Ix, the vehicle weight M, the height of the center of gravity, h, the height of the rolling center, hr, the suspension spring constants of the front and rear wheels, kf and kr, the damper constants of the front and rear wheels, cf and cr, the acceleration due to gravity, g, the treads of the front and rear wheels, bf and br, and a rolling angle, $\theta r$.

$$Ix\theta r'' = \{Mg(h-hr) - kfbf^2/4 - krbr^2/4\}\theta r - (cfbf^2/4 + crbr^2/4)\theta r' + (h-hr)(Fyf+Fyr) \quad \text{[Equation 8]}$$

It is noted that the above vehicle model is simplified because it is a two-wheel model (i.e., the front and rear wheels are united omitting the concept of a rolling shaft) and linear approximation of a suspension characteristic and approximation of a trigonometric function are performed.

[Steering System Movement]

Referring to FIG. 4C, the following equation is established based upon motor torque, Tm, torsion torque, Ts, pinion gear ratio, Np, motor gear ratio, Ng, rack equal mass, Mr, a motor inertia moment, Jm, and a rack load, kFyf, which is proportionally approximate to lateral force of the front wheel and a pinion angle $\theta p$.

$$(Np^2 Mr + Ng^2 Jm)\theta p'' = -(Np^2 Cr + Cp)\theta p' - NpkFyf + Ts + NgTm. \quad \text{(Equation 9)}$$

It is noted that the above vehicle model is simplified. More specifically, the model is simplified due to unification of inertia in a shaft, a worm gear, and the like. (I.e., equivalent inertia is possibly reduced by a driver input from a steering wheel.) Also, the model is simplified due to unification of inertia from rack to tire steering, performing lateral force linear approximation of self-aligning torque, and ignoring tire spring characteristics and the like.

From the above vehicle model, a 6×6 series equation as shown below is obtained by setting, as state amounts, $\theta p$, $\theta p'$, $\gamma$, $\beta$, $\theta r$ and $\theta r'$, and by setting, as an input of this model, the torque obtained by combination of steering torque, Ts, and torque, Ng*Tm (motor torque times a gear ratio Ng) required for realizing assist force in the motor 4, and by denoting steering shaft torque with Tc.

$$\frac{d}{dt}\begin{bmatrix} \theta p \\ \theta p' \\ \gamma \\ \beta \\ \theta r \\ \theta r' \end{bmatrix} = \begin{bmatrix} 0 & 1 & 0 & 0 & 0 & 0 \\ \frac{kN_p K_f}{A_1 N_s} & -\frac{N_p^2 C_r + C_p}{A_1} & \frac{kN_p K_f L_f}{A_1 V} & \frac{kN_p K_f}{A_1} & 0 & 0 \\ \frac{K_f L_f}{I_z N_s} & 0 & \frac{-K_f L_f^2 - K_r L_r^2}{I_z V} & \frac{R_3}{I_z} & 0 & 0 \\ \frac{K_f}{MVN_s} & 0 & \frac{R_3}{MV^2} - 1 & \frac{-K_f - K_r}{MV} & 0 & 0 \\ 0 & 0 & 0 & 0 & 0 & 1 \\ \frac{K_f(h-h_r)}{I_x N_s} & 0 & \frac{R_3(h-h_r)}{I_x V} & \frac{(h-h_r)(-K_f - K_r)}{I_x} & R_1 & R_2 \end{bmatrix} \quad \text{(Equation 10)}$$

$$\begin{bmatrix} \theta p \\ \theta p' \\ \gamma \\ \beta \\ \theta r \\ \theta r' \end{bmatrix} + \begin{bmatrix} 1 \\ -\frac{1}{A_1} \\ 0 \\ 0 \\ 0 \\ 0 \end{bmatrix}[T_s + N_g T_m]$$

In Equation 10, A1, R1, R2, and R3 are defined as follows.

$$\begin{cases} A_1 = N_p^2 M_r + N_g^2 J_m \\ R_1 = -\frac{1}{I_x}\left\{Mg(h-h_r) - \frac{k_f b_f^2}{4} - \frac{k_r b_r^2}{4}\right\} \\ R_2 = -\frac{1}{4I_x}(c_f b_f^2 + c_r b_r^2) \\ R_3 = -K_f L_f + K_r L_r \end{cases} \quad \text{(Equation 11)}$$

Accordingly, it is possible to determine a torque correction amount, $\Delta T$, by multiplying a predetermined state feedback gain F (F1 to Fn) over each state amount x ($\theta ep$, $\theta p'$, $\gamma$, $\beta$, $\theta r$ and $\theta r'$) of the 6×6 series equation.

The feedback gain F is set based upon environment information obtained from the environment information detecting section 8 and/or a vehicle state obtained from the vehicle state detecting section 9. A method for determining the state feedback gain, F, by using both the environment information and the vehicle state will be explained. It will be appreciated that only one of or both of the environment information and the vehicle state could be used to determine the state feedback gain, F.

For example, when a feedback gain F is determined by using the turning degree of the vehicle, a vehicle wheel speed sensor may be used, for example, as the vehicle state detecting section 9, as shown in FIG. 3.

As a turning degree detecting section 21a, the turning degree is estimated by determining a speed difference between the right and left vehicle wheels based upon a detection signal of the vehicle wheel speed sensor. More specifically, a physical quantity having a dimension of lateral acceleration estimated from the vehicle wheel speed is determined by the following equation.

$$Gyest1 = (Vwr + Vwl) \cdot (Vwr - Vwl)/bf \quad \text{(Equation 12)}$$

Vwr and Vwl denote right and left vehicle wheel speeds respectively and bf denotes a front wheel tread.

In addition, a virtual load shift amount, $\Delta Wt$, in accordance with the turning degree is determined as a function of an absolute value of Gyest1 (i.e., |Gyest1|) at a first virtual load shift amount detecting section 21b. For example, since a gain of a vehicle behavior to steering is reduced at the time of high turning degree, the virtual load shift amount $\Delta Wt$ is shifted toward the front wheel, for compensating for the gain reduction.

In addition, when a state feedback gain F is determined by using a curve degree corresponding to the environment information, for example, as shown in FIG. 3, a curvature is determined by the curve degree detecting section 21c at the environment information detecting section 8, thereby making it possible to estimate the curve degree. For example, when a curvature for each of a few seconds ahead of the reference vehicle is $\rho t1, \rho t2, \ldots \rho tn$, a weighted average curvature around timing in two seconds is represented by the following equation.

$$\rho w = \Sigma wi \cdot \rho ti \quad \text{(Equation 13)}$$

A physical quantity having the dimension of lateral acceleration estimated from this curvature is determined by the following equation.

$$Gyest2 = \rho w V^2 \quad \text{(Equation 14)}$$

In addition, a virtual load shift amount, $\Delta Wr$, in accordance with the curve degree is determined as a function of an absolute value of Gyest2 (i.e., |Gyest2|) at a second virtual load shift amount detecting section 21d. For example, for an increase in gain of a vehicle behavior to steering during a sharper curve degree, the virtual load shift amount, $\Delta Wr$, is shifted toward the front wheel.

In addition, when a state feedback gain, F, is determined by using an approach degree corresponding to the environment information, for example, as shown in FIG. 3, a vehicle-to-vehicle distance and a relative speed between vehicles are determined by the approach degree detecting section 21e of the environment information detecting section 8. As such, the approach degree can be estimated. For example, a contact time $\tau$ can be determined based upon a vehicle-to-vehicle distance, D, and a relative speed, Vr, by the following equation.

$$\tau = -D/Vr \quad \text{(Equation 15)}$$

An approach degree can be converted into information (which is a positive value when approaching and is a negative value when traveling away) by defining the approach degree as $1/\tau$ (i.e., the inverse value to the above equation 15). A virtual load shift amount, $\Delta Wv$, in accordance with the approach degree, $1/\tau$, is determined as a function of, $1/\tau$, at a third virtual load shift amount detecting section 21f. For example, as $1/\tau$ increases as a positive value, the virtual load shift amount, $\Delta Wv$, is shifted more to the front wheel.

In addition, as shown in FIG. 3, the load changing amount is determined in accordance with a road gradient at a load changing amount detecting section 21g. Thereafter, a fourth virtual load shift amount detecting section 21h determines a virtual load shift amount, $\Delta Wn$, according to the road gradient. It will be appreciated that the virtual load shift amount may be determined based upon various other vehicle states or environment information without departing from the scope of the present disclosure.

Next, a virtual load shift amount $\Delta W$ (i.e., a sum of the virtual load shift amounts $\Delta Wt$, $\Delta Wr$, $\Delta Wv$) is determined by the following equation.

$$\Delta W = \Delta Wt + \Delta Wr + \Delta Wv \quad \text{(Equation 16)}$$

A response definition parameter is determined based upon this total virtual load shift amount $\Delta W$ by a setting indicator detecting section 21i. For instance, a damping constant $\zeta$ (i.e., a design indicator) is determined in this manner by the setting indicator detecting section 21i. With the damping constant, $\zeta$, a target characteristic after the state feedback broadens a band or increases or decreases a damping level. For example, vehicle movement can be such that the vehicle is easier to turn when the damping constant, $\zeta$, is low and the vehicle is more difficult to turn when the damping constant, $\zeta$, is high. Therefore, a characteristic map is set at the setting indicator detecting section 21i to either increase or decrease the damping constant, $\zeta$, in accordance with a vehicle state or environment information. The response definition parameter may be expressed further by a time constant $\tau$, a natural frequency $\omega n$ (on, a setting time T, or the like.

Thereafter, each element F1 to Fn of the state feedback gain, F, is determined in accordance with the determined damping constant, $\zeta$, at a feedback gain setting section 22. In addition, the state feedback gain, F, is designed to include the number of elements equal to a product of the number of state amounts and the number of input variables of the vehicle model.

The feedback gain is set according to the following:

First, in a vehicle travel environment in which the driver is more likely to view surroundings near a vehicle, a band of a transmission characteristic is wider, or a gain in the vicinity of the natural frequency is increased, as compared to a vehicle travel environment in which the driver is less likely to view surroundings near the vehicle.

For instance, in one embodiment, the vehicle travel environment is one in which the driver is more likely to view surroundings near a vehicle when the vehicle speed is low, as the vehicle approaches a curve with a relatively small radius of curvature (i.e., the curve is large), when the vehicle is traveling uphill, when the vehicle is merging, when the road is relatively narrow, when another vehicle is approaching, when the reference vehicle is approaching an obstacle, when the weather conditions are bad, and/or when the visibility is relatively low. In these conditions, a band of a transmission characteristic or a gain is increased in the vicinity of the natural frequency.

More specifically, when the vehicle speed is relatively low, a driver is likely to view near the vehicle, and the line of sight of the driver is likely to be closer to the vehicle. When the vehicle approaches a curve with a relatively small radius of curvature, a distance near an inner tangent of the curve is shortened. When driving uphill, a line between the reference vehicle and a point ahead of the reference vehicle projected on the horizontal plane becomes shorter. When the reference vehicle approaches an intersection or a merging lane, the line of sight of the driver is closer to the vehicle due to the possibility of an approaching object. When driving in bad weather or poor visibility (e.g., in low light or foggy conditions), the visual range is narrower. Therefore, in these environments, the band of a transmission characteristic is wider or the gain in the vicinity of the natural frequency is increased, in the same as the above characteristic.

An operation amount of control is determined focused on characteristics in the vicinity of one or more of sprung and unsprung natural frequencies, respectively, as the vehicle behavior. For example, a sprung vehicle behavior is shown as a yaw movement, a rolling movement, or a vehicle body up/down movement. Therefore, the operation amount of the control is determined focused on the characteristic in the vicinity of at least one of the above natural frequencies. On the other hand, an unsprung vehicle behavior is shown as a tire lateral force, a tire steering behavior, a rack displacement, or a pinion rotational behavior. Therefore, an operation amount of the control is determined focused on the characteristic in the vicinity of at least one of the natural frequencies among them.

Thus, the state feedback gain F is set. As described above, the load shift amount is determined from environment information to determine a damping constant, $\zeta$, and to thereby determine the state feedback gain F. This determination method is based upon the following concept.

To determine movement characteristics of the vehicle in response to environment information, the vehicle is steered to a specific turning direction, and a deviation from the turning timing/degree desired by the user more readily occurs. Therefore, the load shift is used for providing an easy-to-turn or difficult-to turn characteristic as a vehicle transient characteristic.

As ground load shifts toward the front wheel, a lateral force in the front wheel (due to steering) increases to thereby increase a turning force. In contrast, as ground load shifts toward the rear wheel, a lateral force in the rear wheel increases to thereby improve vehicle stability. Accordingly, a desired vehicle turning characteristic is defined in relation to a road curvature or an approach degree of another vehicle considering this load shift amount, and different information can be evaluated with the same dimension (i.e., physical quantity). Furthermore, a transient characteristic in response to a driver's driving operation is easier to obtain.

For determining vehicle movement characteristics to the integrated result, the vehicle movement characteristics are correlated with the damping constant, $\zeta$, for approximately expressing input/output second order system. The damping constant is defined in the range of 0<$\zeta$. As the damping constant approaches zero, rising time reduces, and instead the movement is vibratory. In contrast, as the damping constant increases, the damping increases to provide more stabilized movement. Feedback gain, F, is predetermined with a pole placement such that the vehicle model includes the damping constant, $\zeta$, and poles of the second order system produced by combination of set natural frequencies (e.g., 1-3 Hz), which is provided as a table of $\zeta$ and F.

In this way, logic from various pieces of environment information to the feedback gain is constituted to realize a desired vehicle movement characteristic. The control system responds to the driver's driving operation. In other words, the control logic has no specific timing of correction and instead starts with the driver's driving operation. As a result, the control system is unlikely to control the vehicle against the driver's intent, and the controls are unlikely to interrupt normal vehicle driving.

When the state feedback gain F is thus set, the torque correction amount, $\Delta T$, is determined based upon the above state feedback by using the state feedback gain, F.

The assist correction section 10d determines an assist force to be actually generated by subtracting the correction amount, $\Delta T$, determined by the torque correction amount setting section 10c from the basic assist amount, Ta, determined by the basic assist amount setting section 10b. In other words, the assist force actually generated is equal to "Ta–$\Delta T$".

The motor torque control section 10e determines a motor torque, Tm, to be generated by the motor 4. The amount of motor torque, Tm, corresponds to the assist force determined by the assist correction section 10d. Also, the motor torque control section 10e determines a command value, Im*, of an electrical current to be supplied to the motor 4 for generating the motor torque, Tm. The motor torque control section 10e further receives an actual electrical current value supplied to the motor 4 to drive the motor drive circuit 10f. In one embodiment, this process is performed using PI control so that the actual value, Im, corresponds to the command value, Im*.

The motor drive circuit 10f is controlled by the motor torque control section 10e. In one embodiment, the motor drive circuit 10f includes a transistor for adjusting the electrical current supplied to the motor 4. Switching the transistor causes the electrical current of the command value, Im*, to be fed to the motor 4. In addition, the motor drive circuit 10 detects the actual value, Im, of the electrical current supplied to the motor 4 and feeds back the actual value, Im, to the motor torque control section 10e. As such, the motor toque control section 10e is designed to perform the above Pi control or the like.

The construction of the first embodiment of the steering control system has been described. Next, operations of the steering control system will be explained.

When the driver turns the steering wheel 1, the steering shaft 2 is rotated. More specifically, when the upper shaft portion 2a rotates, and an assist force in accordance with the rotation is determined from a detection signal of the steering torque sensor 3 through the phase compensation section 10a and the basic assist amount setting section 10b. In addition, a torque correction amount, $\Delta T$, is determined at the torque correction amount setting section 10c based upon detection results of the steering torque sensor 3, the vehicle speed sensor 7, the environment information detecting section 8, and the vehicle state detecting section 9.

The assist force (Ta–$\Delta T$) is determined from the basic assist amount, Ta, and the torque correction amount, $\Delta T$, at the assist correction section 10d. The motor torque control section 10e determines and outputs the command value, Im*, of the electrical current to be supplied to the motor 4 for obtaining the assist force. In addition, the motor torque control section 10e controls the motor drive circuit 10f to thereby supply the electrical current of the command value, Im*, to the motor 4. As such, torque transmitted from the upper shaft portion 2a is added to the torque supplied by the motor 4 to produce steering shaft torque at the lower shaft portion 2b.

When the steering shaft torque is thus supplied to the lower shaft portion 2b, it is transmitted through the steering gear mechanism 5 and the steering link mechanism 6 to the right and left wheels 11a, 11b. As such, the wheels 11a, 11b are steered in the same direction and according to the steering shaft torque to have the desired steering angle.

Next, effects obtained from the steering control system will be explained.

According to the steering control system of the first embodiment, vehicle movement is estimated based upon the state of the steering control system. In other words, output from the steering torque sensor 3 corrects the torque to be generated in the lower shaft portion 2b in such a manner as to provide a desired characteristic. Furthermore, the detection results of the environment information detecting section 8 and the vehicle state detecting section 9 are used to adjust the steering shaft torque.

In detail, a band of the transmission characteristic until the steering shaft torque is transmitted as the vehicle behaviors such as the yaw rate and the rolling is narrowed or broadened. Also, a gain at approximately the natural frequency (the frequency in which the transmission characteristic peaks) of the transmission characteristic is adjusted. For instance, the gain at approximately the natural frequency increases.

Figure 5A:
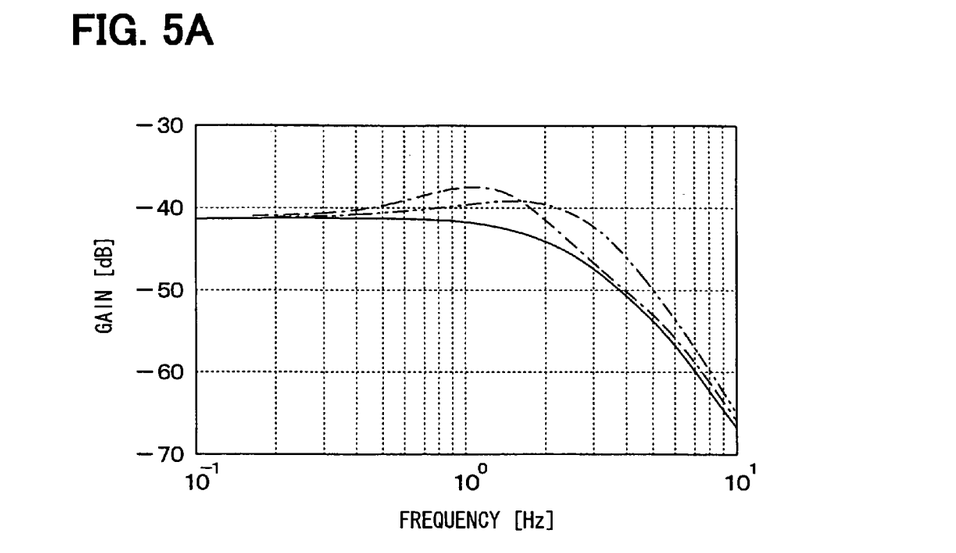
FIG. 5A is a graph showing response characteristics in steering shaft torque, yaw rate, and rolling, which are illustrated by relating gain characteristic to frequency.
Figure 5B:
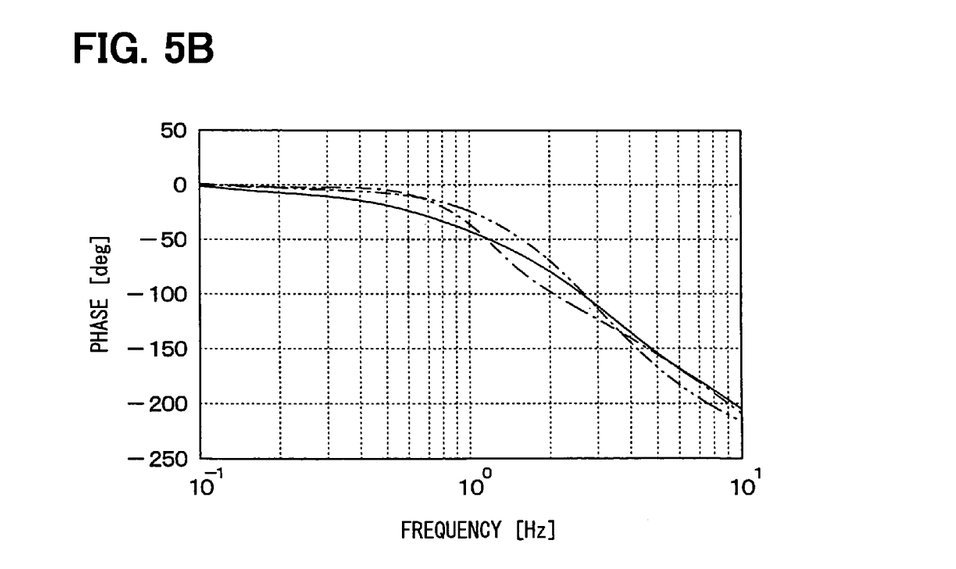
FIG. 5B is a graph showing response characteristics in steering shaft torque, yaw rate, and rolling, which are illustrated by relating phase characteristic to frequency.
Figure 6A:
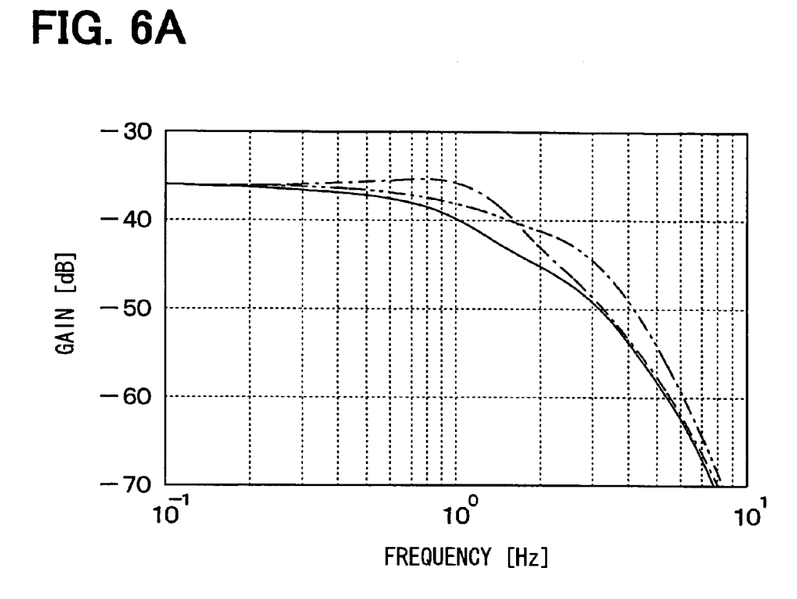
FIG. 6A is a graph showing response characteristics in steering shaft torque, yaw rate, and rolling, which are illustrated by relating gain characteristic to frequency.
Figure 6B:
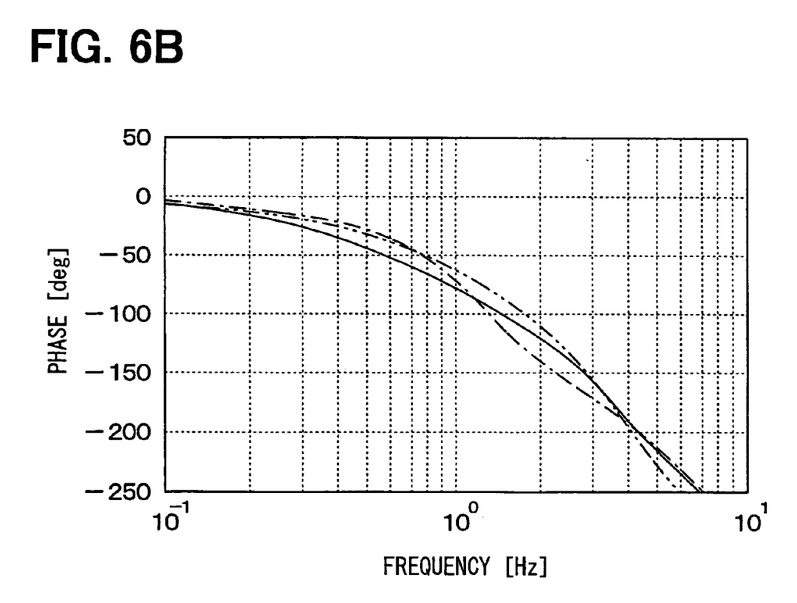
FIG. 6B is a graph showing response characteristics in steering shaft torque, yaw rate, and rolling, which are illustrated by relating phase characteristic to frequency.

FIGS. 5A, 5B, 6A, and 6B show examples where a band of the transmission characteristic is changed (i.e., narrowed or broadened). Each shows response characteristics of steering shaft torque, yaw rate, and rolling. FIGS. 5A and 6A show a gain characteristic in relation to a frequency and FIGS. 5B and 6B show a phase characteristic in relation to a frequency.

In the figures, the dashed line represents a state in which the steering shaft torque is not corrected (i.e., a basic characteristic). In addition, the chain double-dashed line represents a state in which a band of the transmission characteristic by the pole placement is broadened (e.g., a range from a normal state to a frequency reduced by 3 dB). A solid line represents a state in which a band is narrowed by the pole placement (or a characteristic aiming at stabilizing by increasing damping at approximately the natural frequency).

In this way, the vehicle movement state is estimated based upon the detection signal of the steering torque sensor 3 to correct the steering shaft torque generated in the lower shaft portion 2b, and the desired characteristic can be provided. Further, the detection results of the environment information detecting section 8 and the vehicle state detecting section 9 are reflected in correction of the steering shaft torque and the band of the transmission characteristic until the steering shaft torque is transmitted as the vehicle behavior. For instance, the yaw rate or vehicle rolling is narrowed or broadened or the gain in the vicinity of the natural frequency is adjusted to obtain the following effects.

(1) In regard to a response characteristic of a vehicle to a steering input (i.e., steering force):

When a certain torque input is applied to the steering wheel 1, reducing assist force in the vicinity of one or more vehicle sprung/unsprung natural frequencies causes a maximum turning angle of a tire and causes a vehicle behavior to be reduced, thereby restricting the vibration.

When an input is applied at a certain angle to the steering wheel 1, reducing assist force in the vicinity of one or more vehicle sprung/unsprung natural frequencies causes a reaction to a driver to increase, thus damping the characteristic from reaction to behavior. Therefore, the driver has an impression that the behavior is not generated in response to the load.

Accordingly, if the steering input by a driver is defined by the torque and the angle, stability of a vehicle improves. Also, it is possible to transmit the stabilized vehicle state to the driver. In other words, a driver can feel the feedback in accordance with vehicle movement through the steering wheel 1.

The effects produced by reducing the assist force in the vicinity of the natural frequency are shown and described above. However, since the vehicle movement brings about the above characteristic changes, it may be preferable that the assist force is not only reduced but also controlled in a direction to compensate for the characteristic deterioration (e.g., when the turning degree is high). In this case, the assist correction is made by broadening a band of the transmission characteristic or by increasing a gain of the deteriorated band.

In this way, the characteristic in the vicinity of the sprung natural frequency of the vehicle is forced to be uniform regardless of vehicle traveling states. Thereby, vehicle resonance vibrations returned back to a driver through the steering wheel are reduced to reduce noises given to the driving operation of the driver. As such, it easier for the driver to adjust the steering wheel.

For example, when the reference vehicle travels on a curved road, and the curve increases (i.e., when the curve gets sharper), the turning capability of the vehicle is improved by correction so that the vehicle moves as intended by the driver.

(2) In regard to response characteristics of a vehicle for steering input according to environment:

Since a steering shaft torque is corrected according to environment information, it is possible to adjust the response characteristics of the vehicle to a steering input according to the environment of the vehicle.

For example, when it is desired to increase turning response, a band of the transmission characteristic of the vehicle to a steering input (i.e., steering force) is broadened. When it is desired to create lateral shift behavior, the band is narrowed or a gain near the natural frequency is reduced.

This causes a reaction change when the driver steers in response to environment changes to correspond to the driver's expectations. As such, it becomes easier to steer the vehicle.

In addition, in conditions where the driver is more likely to view the surroundings near the vehicle, responsiveness of the turning side may be increased. In contrast, in conditions where the driver is more likely to view distant objects, responsiveness may be reduced. It will be appreciated that, in another embodiment, the responsiveness of the turning side may be decreased when the driver is more likely to view surroundings near the vehicle, and responsiveness may be increased where the driver is more likely to view distant objects.

OTHER EMBODIMENTS

The steering control operation in response to environment changes can be applied not only to reaction control but also to steering control. In this case, when the turning capability (i.e., the vehicle characteristic) is reduced or the turning is required (i.e., the state of vehicle traveling environment), responsiveness from a steering input to a vehicle movement may be increased.

Further, it will be appreciated that the steering control system could be implemented in a column type system, a pinion type system, or the like in which an assist force is added to the lower shaft portion 2b. The steering control system could also be implemented in a system in which an assist force is added at a rack position. More specially, the present invention can be implemented in a system in which a ball screw is formed in a rack and wherein a motor is rotated around the rack to cause an assist force to be added. Furthermore, the present invention can be implemented in a system in which the assist force is generated by teeth in a rack, a pinion rotated by a worm wheel, a worm and a motor, or any suitable device.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A steering control system for a vehicle with a plurality of wheels, the steering control system comprising:
   a steering wheel;
   a steering shaft including an upper shaft portion and a lower shaft portion, wherein torque is transmitted to the upper shaft portion by a steering input to the steering wheel, wherein steering shaft torque of the lower shaft portion corresponds to the torque transmitted to the upper shaft portion, and wherein the steering shaft torque steers the wheels;
   a steering torque detector which generates an output signal corresponding to a torsion angle between the upper shaft portion and the lower shaft portion to detect a steering torque;
   an assist force generating device that generates an assist force according to a control signal to thereby generate torque in the lower shaft portion;
   a controller for outputting the control signal to the assist force generating device based upon the steering torque detected by the steering torque detector;
   a vehicle speed detector that detects a speed of the vehicle; and
   an environment information detector that detects environment information of the vehicle, the environment information including an environment of a road ahead of the vehicle on which the vehicle is traveling,
   wherein the controller comprises:
      a basic assist amount setting device that sets a basic assist amount according to the vehicle speed detected by the vehicle speed detector and to the steering torque detected by the steering torque detector;
      a torque correction amount setting device that determines a torque correction amount based upon the environment information detected by the environment information detector; and
      an assist correction device that determines the assist force based upon the basic assist amount set by the basic assist amount selling device and the torque correction amount determined by the torque correction amount setting device.

2. The steering control system according to claim 1, wherein:
   the environment information detector detects at least one of a road curve, a road gradient, a road merging, a road branching, a road intersection, a road width, an obstacle of the vehicle, a weather condition affecting the vehicle, and a visibility from the vehicle as the environment information of the vehicle.

3. The steering control system according to claim 2, wherein:
   when the environment information indicates the driver is more likely to view surroundings within a predetermined distance of the vehicle,
   the torque correction amount setting device sets the torque correction amount such that at least one of
   a band of a transmission characteristic of a vehicle behavior to the steering input is broadened, and
   a gain at approximately a natural frequency increases,
   as compared to when the driver is less likely to view surroundings within the predetermined distance of the vehicle.

4. The steering control system according to claim 3, wherein:
   the environment information indicates that the driver is more likely to view surroundings within the predetermined distance of the vehicle wherein an environmental condition exists for a road upon which the vehicle is traveling, the environmental condition chosen from a group consisting of:
   the curvature of the road increases,
   the road is an uphill road,
   the vehicle approaches an intersection in the road,
   the vehicle approaches a merging lane in the road,
   the road narrows,
   the vehicle approaches a second vehicle,
   the vehicle approaches an obstacle,
   the weather condition is hazardous, and
   the visibility from the vehicle reduces.

5. The steering control system according to claim 4, wherein:
   the environment information detector includes a navigation device for storing road map information and outputs, as the environment information, information correlating to the curvature of the road to the torque correction amount setting device, and
   the torque correction amount setting device includes a curve degree detector which detects a curve degree based upon the curvature.

6. The steering control system according to claim 4, wherein:
   the environment information detector detects environment information correlating to a distance between the vehicle and the second vehicle and a relative speed between the vehicle and the second vehicle, and
   the torque correction amount setting device includes an approach degree detector which detects an approach degree of the second vehicle based upon the environment information correlating to the distance and the relative speed.

7. The steering control system according to any of claim 4, wherein:
   the environment information detector detects environment information correlating to a gradient in the road, and
   the torque correction amount setting device includes a load changing amount detector which detects a load changing amount of the vehicle based upon the gradient.

8. The steering control system according to claim 4, wherein:
   the torque correction amount setting device includes a vehicle model for calculating a vehicle behavior for the assist force, and wherein the torque correction amount setting device further includes a state feedback gain setting device for determining a feedback gain, wherein:
   the state feedback gain setting device determines the feedback gain based upon the environment information detected by the environment information detector; and
   the torque correction amount is determined based upon the steering torque by using the vehicle model and the feedback gain.

9. The steering control system according to claim 7, wherein:
   the torque correction amount setting device determines a virtual load shift amount based upon the environment information and a response definition parameter from the virtual load shift amount; and the feedback gain is determined based upon the response definition parameter.

10. The steering control system according claim 4, further comprising:

a vehicle state detector which detects a vehicle state correlating to behavior of the vehicle, wherein:

the torque correction amount setting device determines the torque correction amount based upon the environment information and the vehicle state.

11. A steering control system for a vehicle with a plurality of wheels, comprising:

a steering wheel;

a steering shaft including an upper shaft portion and a lower shaft portion, wherein torque is transmitted to the upper shaft portion by a steering input to the steering wheel, wherein steering shaft torque of the lower shaft portion corresponds to the torque transmitted to the upper shaft portion, and wherein the steering shaft torque steers the wheels;

a steering torque detector that generates an output signal corresponding to a torsion angle between the upper shaft portion and the lower shaft portion to detect a steering torque;

a motor operated according to a control signal to generate an assist force, thereby generating torque in the lower shaft portion;

a controller that outputs the control signal to the motor based upon the steering torque detected by the steering torque detector;

a vehicle speed detector that detects a vehicle speed of the vehicle; and a vehicle state detector that detects a vehicle state associated with a behavior of the vehicle, the vehicle state including a turning state of the vehicle;

wherein the controller comprises:

a basic assist amount setting device that sets a basic assist amount in accordance with the vehicle speed and the steering torque;

a torque correction amount setting device that determines a torque correction amount based upon the vehicle state detected by the vehicle state detector; and an assist correction device that determines the assist force based upon the basic assist amount and the torque correction amount.

12. The steering control system according to claim 11, wherein:

the vehicle state detector includes a turning degree detector which detects a turning degree of the vehicle; and the torque correction amount setting device determines the torque correction amount based upon the turning degree.

13. The steering control system according to claim 12, wherein:

the turning degree detector estimates the turning degree of the vehicle from at least one of a steering wheel angle, a yaw rate, a lateral acceleration, a difference in speed between the plurality of wheels, and a steering force.

14. The steering control system according to claim 13, wherein:

when an actual turning degree of the vehicle is larger than the turning degree estimated by the turning degree detector, the torque correction amount setting device at least one of:

broadens a band of a transmission characteristic of a vehicle behavior to the steering input, and increases a gain at approximately a natural frequency.

15. The steering control system according to claim 13, wherein:

the torque correction amount setting device includes a vehicle model for calculating a vehicle behavior for the assist force, and wherein the torque correction amount setting device further includes a state feedback gain setting device to determine a feedback gain, wherein:

the state feedback gain setting device determines the feedback gain based upon the environment information detected by the environment information detector; and the torque correction amount is determined based upon the steering torque by using the vehicle model and the feedback gain.

16. The steering control system according to claim 15, wherein:

the torque correction amount setting device determines a virtual load shift amount based upon the environment information and a response definition parameter from the virtual load shift amount; and the feedback gain is determined based upon the response definition parameter.

* * * * *